United States Patent [19]
Lehmann

[11] 4,091,684
[45] May 30, 1978

[54] VARIABLE SPEED CONTROL APPARATUS

[75] Inventor: Werner Lehmann, Gutach, Germany

[73] Assignee: Mathias Bauerle GmbH, Georgen,Schw., Germany

[21] Appl. No.: 594,666

[22] Filed: July 10, 1975

[30] Foreign Application Priority Data

Nov. 15, 1974 Germany .............................. 2454201

[51] Int. Cl.² .............................................. F16H 27/00
[52] U.S. Cl. ......................................... 74/112; 74/116
[58] Field of Search .............. 74/112, 116, 329, 665 G

[56] References Cited

U.S. PATENT DOCUMENTS

| | | | |
|---|---|---|---|
| 1,250,546 | 12/1917 | Blydenburgh | 74/329 |
| 2,507,756 | 5/1950 | Boylan | 74/112 |
| 3,853,015 | 12/1974 | Bertozzi et al. | 74/112 |

*Primary Examiner*—Samuel Scott
*Assistant Examiner*—Wesley S. Ratliff, Jr.
*Attorney, Agent, or Firm*—Finnegan, Henderson, Farabow & Garrett

[57] ABSTRACT

A variable speed control apparatus is provided for operating a work member in a first mode at a given uninterrupted speed and in a second mode intermittently in incremental movements. The apparatus comprises a drive motor, actuator means drivingly associated with the motor, coupling means actuable into and out of driving relation with the motor and control means associated with the work member. The work member is operated in the first mode in response to actuation of the coupling means into driving relation with the motor and, in response to actuation of the coupling means out of driving relation with the motor, the actuator means operates the control means for operating the work member in the second mode.

11 Claims, 3 Drawing Figures

VARIABLE SPEED CONTROL APPARATUS

BACKGROUND OF THE INVENTION

The use of control means including electromagnetic clutch means for selectively coupling gear driven work members or shafts is generally known. Also known are variable speed gear arrangements for selectively driving work members at two different speeds. Normally, however, these gear arrangements require shifting of the gears for changing from one speed to another and the electromagnetic clutch means serves merely to transfer the power from one gear train to another.

In those instances where a substantial difference in speed or RPM is required between the drive means and the work member, for example, conversion ratios on the order of 1:50, 1:100, or even 1:30, the known gear arrangements are not only costly to produce but are also relatively noisy in operation. Additionally, such devices require substantial space requirements to permit shifting the gear trains to the proper positions to obtain the selected gear conversion for operating the work member at the desired speed.

SUMMARY OF THE INVENTION

The invention has utility in envelope opening and filling equipment, and in paper handling equipment generally. However, it will be appreciated that the invention may be applied in any mechanical arrangement where drive reduction is required.

The invention relates to a two-speed clutch device in which, by means of an electromagnetic coupling, a work member or shaft may be coupled directly with a drive shaft operating at a high RPM.

The invention comprises a two-speed clutch device of the kind referred to above for obtaining extremely great differences in RPM between the work and the drive shafts, with minimum expense in component parts and with very slight operating noise.

The foregoing is attained by the present invention by arranging on the work shaft at least one one-way clutch including a surrounding sleeve body, and a lever arm fastened to the sleeve body, with a free end of the lever arm biased against an eccentric cam fastened to a shaft extending parallel with the work shaft and in driving relation therewith.

With a two-speed clutch device of this kind, extremely great differences of RPM of the work shaft can be obtained, in which the maximum RPM of the work shaft corresponds to the RPM of the drive shaft, and the minimum RPM of the work shaft depends on the length of the lever arm and the eccentricity of the eccentric cam, providing that a conversion ratio of 1:1 exists between the drive and the cam shafts. This conversion ratio between the drive and the cam shafts may be selected as desired.

In the present invention, when operating at the minimum RPM continuous driving of the work shaft cannot be obtained and only intermittent driving of the work shaft is possible. Nevertheless, the twospeed clutch device of the present invention may be used to advantage, and directly, wherever continuous rotation of the work shaft at a low RPM is not required.

This is the case when the work shaft is used for driving some form of conveyor means such as, for example, a conveyor belt, conveyor rollers, or the like. The device of the present invention is especially suited, for example, for driving a conveyor belt arranged for receiving, collecting and transporting sheet material in a folding machine, wherein the sheets are to be transported singly in rapid succession from the folding machine, or are to be collected in stacks or bundles as they are delivered from the folding machine.

Particularly advantageous is the fact that the present device provides, according to the specific requirements of an application, differences of RPM of 1:100 and even greater, which can be varied as desired even while the drive shaft is turning. Further, the device comprises only a minimum number of parts of simple construction and low cost, is relatively noiseless in operation and compact in size.

Preferably, two one-way clutches each having a surrounding sleeve body, are mounted on the work shaft, and each sleeve body has secured to it a lever arm which is spring biased against eccentric cams mounted on a cam shaft with the eccentrics displaced from each other by 180°.

By providing two one-way clutches and two eccentric cams, the difference in RPM between the maximum (which corresponds to the RPM of the drive shaft) and the minimum RPM is reduced to one-half, provided the conversion ratio between the drive and the cam shafts remains constant. In this way, uniform rotation of the work shaft is obtained. This relatively uniform rotation of the work shaft may be further improved by providing additional sleeve-type one-way clutches and eccentric cams.

It is an object of the present invention to provide a variable speed control apparatus for obtaining extremely great variations between the speeds of a drive member and a work member, wherein the work member may be driven continuously or intermittently in incremental movements.

Another object is to provide a two-speed drive device which is inexpensive to produce, quiet and reliable in operation, and capable of operating the work member in minute incremental movements while operating the drive shaft continuously at high speed.

Other objects, features and advantages of the invention will appear hereinafter as the description proceeds.

IN THE DRAWING

DESCRIPTION OF THE PREFERRED EMBODIMENT

Figure 1:
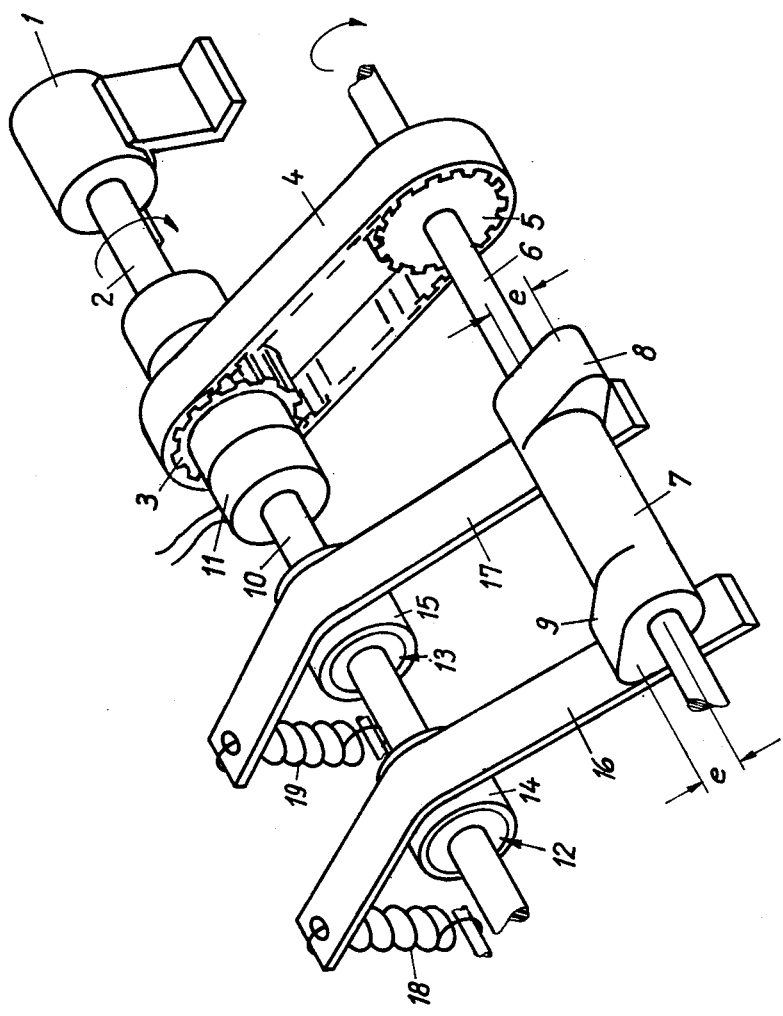
FIG. 1 is a perspective view of a variable speed control device constructed in accordance with the present invention.

A drive shaft 2 is driven at relatively high velocity (RPM) by a motor 1. A pulley 3 is fixed on the drive shaft 2 and, through a belt 4, transmits drive to a pulley 5 secured on a cam shaft 6. The cam shaft 6 is provided with an actuator means 7 comprising a pair of eccentric cams 8 and 9 displaced from each other by 180°.

A work shaft 10 is provided in coaxial relation with the drive shaft 2 and, through an electromagnetic coupling means 11, is drivingly engageable with either the drive shaft 2 or with the pulley 3 on the drive shaft 2. A control means is provided and comprises a pair of one-way clutches 12 and 13 including surrounding and supporting sleeve bodies 14 and 15 respectively, and mounted on the work shaft 10 at an axially spaced distance corresponding to the axially spaced distance of the eccentric cams 8 and 9. The control means further includes a pair of lever arms 16 and 17 rigidly secured to the sleeve bodies 14 and 15, respectively, and each lever arm is provided at a free end thereof with a spring 18 and 19 respectively, for urging the other end of the lever arms 16 and 17 into operable engagement against the eccentric cams 9 and 8 respectively.

Figure 2:
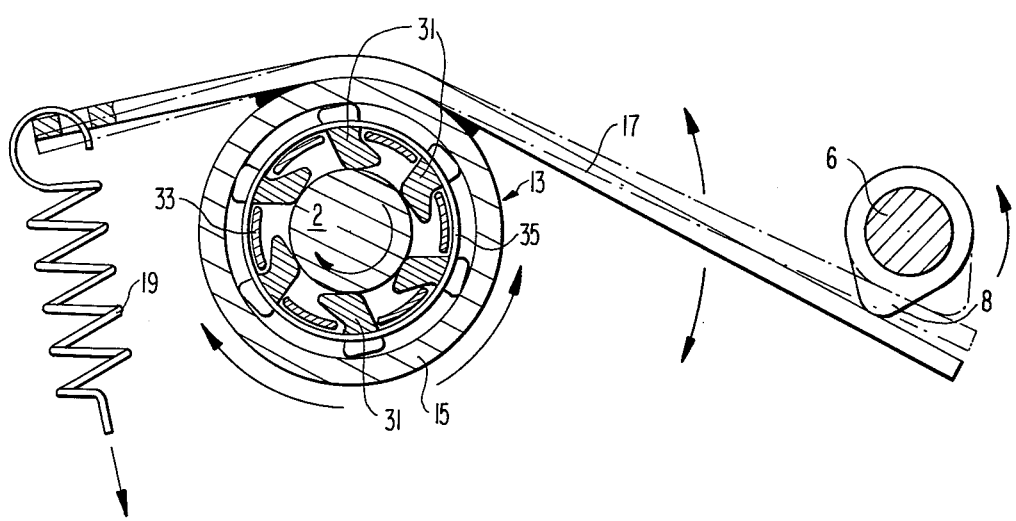
FIG. 2 is an enlarged sectional view showing a preferred form of one-way clutch employed in the present invention.

As shown in FIG. 2, one form of one-way clutch 13 usable in this invention includes a plurality of clamping shoes 31 pivotally carried by a positioning case 33 and located between the sleeve 15 and shaft 10. A spring 35 surrounds case 33 and holds the shoes 31 in place.

As will be apparent to those skilled in the art, when sleeve 10 is rotated in a clockwise direction, as shown in FIGS. 1 and 2, shoes 31 also pivot or rock in a clockwise direction and wedge between sleeve 15 and shaft 10 causing these parts to rotate conjointly.

Conversely, when sleeve 15 is rotated in a counter-clockwise direction, the pivotal or rocking motion imparted to clamping shoes 31 frees them from wedging engagement so that the sleeve 15 rotates freely and does not transmit rotation to the shaft.

Figure 3:
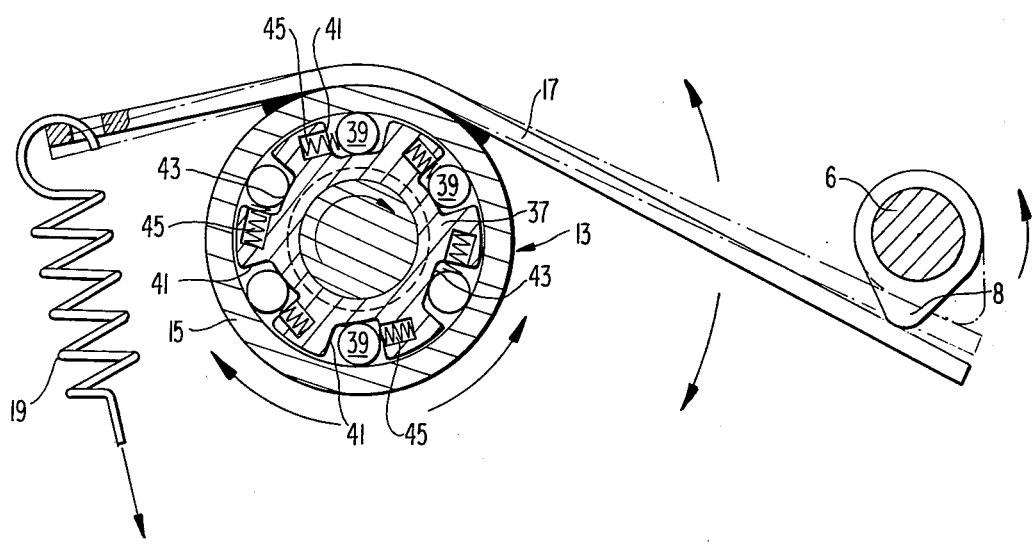
FIG. 3 is a view similar to FIG. 2 showing a modified form of one-way clutch.

An equivalent one-way clutch arrangement is shown in FIG. 3 and includes a case 37 fixed to shaft 10 and having rollers 39 disposed in pockets 41. Each of the pockets 41 has a tapered ramp surface 43, and springs 45 normally bias the rollers 39 into wedging engagement between surfaces 43 and sleeve 15.

As will be appreciated by those skilled in the art, clockwise rotation of sleeve 15 imparts corresponding clockwise rotation to shaft 10. Conversely, sleeve 15 rotates freely in a counterclockwise direction and, when the sleeve 15 is so rotated, it freewheels on the shaft 10.

The direction of rotation of the one-way clutches 12 and 13 is opposite to the direction of rotation of the drive shaft 2 and the cam shaft 6, the rotation of the shafts being shown by the arrows in the drawing. Thus, when the electromagnetic coupling means 11 is energized, the work shaft 10 is coupled in driving relation with the drive shaft 2 and is rotatably driven at the velocity of the drive shaft 2 (first mode), the one-way clutches 12, 13 allowing the sleeves 14, 15 to idle. When the electromagnetic coupling means 11 is de-energized, the control means operates the work shaft 10 intermittently (second mode). The second mode is one where the work shaft 10 starts and stops in response to the swinging movements exerted alternately on the lever arms 16 and 17 by the eccentric cams 9 and 8 respectively.

The amount of swinging movement of the lever arms 16 and 17, which is governed by the eccentricity of the eccentric cams 8 and 9 as represented in the drawing by the reference character e, and the distance between the axes of the work shaft 10 and the cam shaft 6 determines the minimum RPM or stepping movement of the work shaft 10. Thus, a shorter distance between the axes of the work shaft 10 and the cam shaft 6, and/or a larger eccentricity e, will result in larger increments or intermittent rotation of the work shaft 10, for each swinging movement of one of the lever arms 16 and 17, than a longer distance between the work shaft 10 and the cam shaft 6, and/or a smaller eccentricity e.

A description of an overall operation of the apparatus will now be given. Through the pulleys 3 and 5, and the belt 4, the cam shaft 6 is drivingly associated with the drive shaft 2 and is rotated continuously at the same RPM as the drive shaft 2. This condition obtains regardless of whether the electromagnetic coupling means 11 is energized or de-energized.

As long as the electromagnetic coupling means 11 is in a de-energized state, the work shaft 10 is stationary except to be rotated incrementally by the one-way clutches 12 and 13. Thus, rotation of the eccentric cams 8 and 9 acting against the lever arms 17 and 16 respectively, results in rotation of the lever arms through an angle (which can be selectively predetermined as stated supra), for example, of 5°.

Each time one of the lever arms is rotated in a clockwise direction, as viewed from the left in the drawing, the work shaft 10 is rotated in the same direction for an incremental movement of about 5°. Because the one-way clutches 12 and 13 are operable in only a single direction, rotational movement of the lever arms 16 and 17 in a counter-clockwise direction are idling movements which do not have any effect on the operation of the apparatus. Also, once the work shaft 10 has been incrementally rotated it cannot return or rotate in the opposite direction because the one-way clutches 12 and 13 merely idle when the lever arms are oscillated in the counter-clockwise direction, and are effective to engage and rotate the work shaft only during clockwise movement of the lever arms 16 and 17.

With the example given, in one full revolution of the drive shaft 2 or the cam shaft 6, the work shaft 10 is rotated 5° resulting in a drive ratio of 72 revolutions of the cam shaft 6 to one revolution of the work shaft 10.

It should be pointed out that the cumulative effect of the combination of the one-way clutch and the action of the lever arms occurring in rapid succession imparts a continuous but greatly reduced speed of rotation to the work shaft 10.

In response to energization of the electromagnetic coupling means 11, the drive shaft 2 and the work shaft 10 are drivingly connected and the transmission ratio between the shafts is 1:1. Under these conditions the lever arms 16 and 17 have no effect on the work shaft 10 since it is driven at a much higher velocity than that at which it can be operated by the lever arms.

Although a pair of eccentric cams 8 and 9 and associated pairs of elements such as the one-way clutches 12 and 13 are shown and described, it is to be understood that fewer than or more than a single pair may be provided. The number of such elements to be used is dependent upon the particular requirements of the application with which the apparatus is to be utilized.

Also, while for purposes of this disclosure the conversion ratio between the pulleys 3 and 5 is shown as being 1:1, other conversion ratios may be selected as desired to meet the particular application requirements.

The variation between the minimum incremental movement and maximum RPM of the work shaft 10 may be selected from a wide range without incurring any additional expense. Also, by means of the electromagnetic coupling 11, the operation of the work shaft 10 can be quickly and reliably altered between the minimum incremental movement and maximum RPM even while the drive shaft 2 is being driven.

The apparatus may also be arranged such that instead of driving the drive shaft 2, the cam shaft 6 may be driven directly by the motor 1. In this case the pulley 3 would be supported for free rotation on the work shaft 10 so that it could be coupled with the work shaft 10 by means of the electromagnetic coupling 11.

The cross sections of the eccentric cams 8 and 9 may also be different from that shown in the drawing. However, the somewhat round or eliptical shape of the eccentric cams as shown is preferred so that the movement at which the lever arms 16 and 17 are accelerated is less, when acted upon by the eccentric cams during constant rotation, to provide for uniform incremental rotation of the work shaft 10.

What is claimed is:

1. A variable speed control apparatus comprising a drive shaft driven in one direction, a work shaft coaxial with said drive shaft, clutch means selectively interconnecting the drive shaft and said work shaft whereby in a first working mode the work shaft is in direct driven relation with the drive shaft and at the velocity thereof, a cam shaft spaced from and parallel to said work shaft, said cam shaft being drivingly connected to said drive shaft for rotation therewith, coupling means on said work shaft, actuator means carried by said cam shaft, lever means extending between said actuator means and said coupling means, said coupling means and actuator means being constantly driven by said drive shaft whereby in a second working mode when said clutch means is disengaged the work shaft is driven intermittently and incrementally.

2. An apparatus as set forth in claim 1 in which the actuator means comprises rotatably driven eccentric cam means.

3. An apparatus as set forth in claim 1 in which the clutch means comprises electromagnetic means adapted to be selectively energized for interconnecting said drive shaft and said work shaft.

4. In a power train, the combination which comprises a driving shaft driven in one direction, a work shaft, first means selectively interconnecting said driving and work shafts and operable to directly connect said driving and work shafts and to disengage said driving shaft from direct connection to said work shaft, second means constantly driven by said driving shaft and; interconnecting said driving and work shafts and operable to impart intermittent motion to said work shaft from said driving shaft, said second interconnecting means including one-way clutch means whereby said work shaft is driven conjointly with said driving shaft when interconnected therewith through said first interconnecting means without disconnecting said second interconnecting means, said work shaft being driven intermittently from said driving shaft when said selective means is operated to disengage said direct connection.

5. A transmission comprising a driving shaft driven in one direction, and a work shaft, first coupling means constantly driven by said driving shaft and imparting intermittent motion to said work shaft, selectively engageable second coupling means operable to directly interconnect said driving and work shafts, said second coupling means being disengageable to disconnect said driving shaft from direct interconnection with said work shaft, said first coupling means including one-way clutch means, whereby said work shaft is driven intermittently by said driving shaft when said second coupling means is disengaged, and said work shaft is driven directly by said driving shaft when said second coupling means is engaged.

6. A transmission as set forth in claim 5 wherein said first coupling means includes rotatable cam means driven by said driving shaft, lever means operable by engagement with said rotatable cam means and interconnected with said one-way clutch means, whereby rotation of said cam means intermittently drives said work shaft.

7. A transmission as set forth in claim 5 wherein said first coupling means includes a pair of one-way clutch means adapted to impart intermittent motion, alternately, to said work shaft.

8. A speed control apparatus for operating a work member continuously at a constant velocity and intermittently in selected predetermined incremental movements comprising:

drive means operable in one direction and at a constant velocity;

said work member comprising a rotatable work shaft operating at the constant velocity of the drive means defining a first mode of operation, and operating intermittently in incremental movements defining a second mode of operation;

coupling means associated with the work member and selectively actuable from a first position out of driving relation with the drive means, to a second position in driving relation with the drive means for operating the work member in a first mode;

actuator means in constant driven relation with the drive means;

control means constantly engaged by the actuator means and operable to operate the work shaft in the second mode in response to actuation of the coupling means from the second to the first position;

said control means comprising a one-way clutch on the work shaft;

said one-way clutch including a sleeve body which, when rotated in a first direction, transmits rotation in the first direction to said work shaft;

a swingable lever arm secured to the sleeve body and having an end thereof extending to a position for coaction with the actuator means; and biasing means for urging said end of the lever arm against the actuator means for imparting swinging movement to the lever arm for operating the sleeve and rotating the work shaft in the second mode of operation.

9. An apparatus as set forth in claim 8 in which there is provided a plurality of control means and a corresponding number of actuator means.

10. A speed control apparatus for rotating a work shaft in a first mode at a given uninterrupted speed, and in a second mode intermittently in incremental movement, comprising:

a drive motor operable in one direction and at a given speed;

electromagnetic means associated with the work shaft and selectively activatable from a first position out of driving relation with said drive motor, to a second position in driving relation with said drive motor, said drive motor when operating in said one direction and said electromagnetic means when in its second position, causing the work shaft to rotate in the first mode;

a one-way clutch on the work shaft;

said one-way clutch including a sleeve body, which, when rotated in a first direction, transmits rotation in the first direction to said work shaft and, when rotated in a second direction, opposite said first direction, idles on said work shaft;

a cam shaft in axially spaced parallel relation with the work shaft;

means interconnecting said cam shaft and said drive motor causing said cam shaft to rotate when said motor is operating in said one direction;

a swingable lever arm secured to the clutch sleeve and having an end thereof extending in a direction towards the cam shaft;

cam means secured on the cam shaft at a position coacting with said one end of said lever arm; and resilient means biasing said end of the lever arm against the cam means so that rotation of said cam shaft and the cam means causes said lever arm to oscillate and the clutch sleeve body to alternately rotate;

said electromagnetic means, when in its first position out of driving relation with the drive motor, causing said work shaft to be driven in the second mode by the drive motor operating in said one direction, and through the action of the interconnecting means, the cam shaft and cam means, the lever arm, and the one-way clutch.

11. An apparatus as set forth in claim 10 in which there is provided a pair of one-way clutches each including a sleeve having a lever arm associated therewith, and in which the cam means comprises an eccentric cam associated with each of the lever arms and displaced from each other by 180°, whereby the cams impart a swinging movement to the lever arms alternately.

* * * * *